C. F. JOHANNING

AUXILIARY BASE AND SWITCH ATTACHMENT FOR TELEPHONES

May 17, 1932. Original Filed Oct. 19, 1929 Re. 18,462

INVENTOR.
Carlos F. Johanning,
BY
John M. Spellman
ATTORNEY.

Reissued May 17, 1932 Re. 18,462

UNITED STATES PATENT OFFICE

CARLOS F. JOHANNING, OF DENISON, TEXAS

AUXILIARY BASE AND SWITCH ATTACHMENT FOR TELEPHONES

Original No. 1,783,936, dated December 2, 1930, Serial No. 400,761, filed October 19, 1929. Application for reissue filed February 13, 1932. Serial No. 592,829.

This invention has for its object to provide a new and improved means for the mounting of a plurality of push buttons for use in an electrical circuit to signal persons or departments in proximity to a telephone.

More particularly the invention consists of an auxiliary base to be used in connection with a standard telephone set, and including several push buttons, keys, or other means for connecting the circuit of an electric battery so that individuals remote from the telephone may be summoned.

The invention also aims to provide a base of this character upon which the ordinary standard telephone set is affixed, the whole being symmetrical and neat in appearance, and wherein the electric current for use in the circuit is separate from the telephone circuit.

The invention will be better understood from a perusal of the following detailed description, taken in connection with the accompanying drawings, and wherein.

Referring more in detail to the drawings, 1 denotes the ordinary base of a standard telephone set, the post being broken away as indicated at 2.

Figure 1:
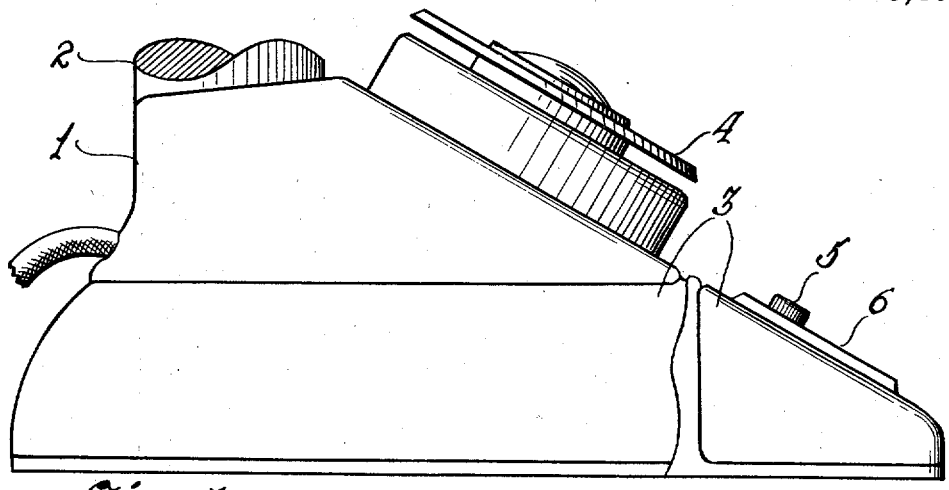
Figure 1 represents a side elevational view in part of a standard telephone of the dial type and illustrating an embodiment of the new and improved base.
Figure 2:
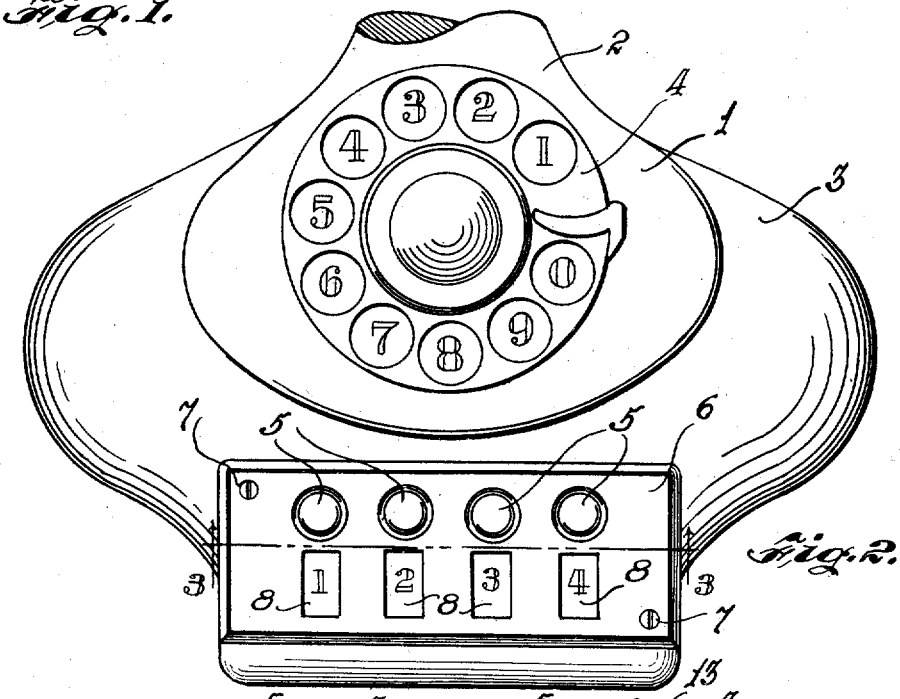
Figure 2 is a front elevational view thereof.
Figure 3:
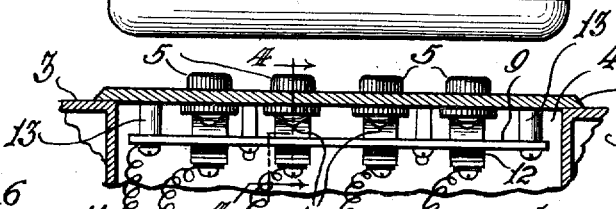
Figure 3 is a sectional detail view, taken along the line 3—3 of Figure 2, showing the push buttons and wiring.
Figure 4:
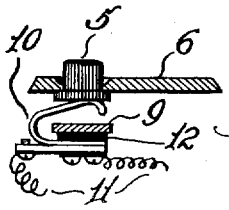
Figure 4 is a detail sectional view showing one of the push buttons and connecting parts.

The invention comprises an auxiliary base 3 made of the same character of material as the regular telephone base and being of circular shape except at the point directly in front of the dial 4. At this point the auxiliary base is directed outwardly and formed therein is a recess 4 for the reception of the push buttons 5, mounted in the panel 6, see Figure 3. The panel 6 is secured to the auxiliary base 3 by means of screws 7. Below the push buttons are numerals placed on the insets 8, these numerals indicating as will be obvious various individuals or departments to be signaled. However, the push buttons may be dispensed with and other means employed to connect and control the circuit. Likewise the numerals may be dispensed with and other characters or names substituted therefor. Also the arrangement is susceptible of other modifications such as substituting a gang push button with one common contact bar.

Below the panel 6 is a contact bar 9 and a spring 10 for returning the button to normal position—common in use. Obviously when the button is depressed the circuit is completed through the spring and contact bar and the current carried along the wires 11 to the battery. The contact bar is properly insulated by the material 12, and the posts 13 support the contact bar from the panel 6.

What is claimed as new, is:

1. The combination of a desk telephone having a base, an auxiliary base adapted to receive said telephone base, and means on said auxiliary base for controlling electrical circuits.

2. The combination of a desk telephone having a base, an auxiliary base adapted to receive said telephone base, and means on said auxiliary base for controlling electrical circuits independent of said telephone.

3. The combination of a desk telephone having a base, an auxiliary base comprising a block upon which said base is adapted to rest and switching means in said block for controlling electrical circuits.

4. The combination of a desk telephone having a base, an auxiliary base comprising a hollow block on which said base is adapted to rest and be fastened, switching means in said block for controlling electrical circuits and identification means for said switching means mounted adjacent thereto on said block.

5. The combination of a desk telephone having a base and an auxiliary base comprising a block upon which said base is adapted to rest, a panel mounted in said block and switching means mounted on said panel.

6. The combination of a desk telephone having a base, an auxiliary base and support adapted to receive said telephone base, said auxiliary base being hollow at least in the part extending in front of the telephone, and electrical switches mounted on said part and extending into said hollow part.

7. The combination of a desk telephone having a base, an auxiliary base adapted to receive said telephone base, an extension on said auxiliary base, and means mounted on said extension for controlling electric circuits.

8. The combination of a desk telephone having a base, an auxiliary base adapted to receive said telephone base, an extension on the front side of said auxiliary base, and means mounted on said extension for controlling electric circuits.

9. The combination of a desk telephone having a base, an auxiliary base adapted to receive said telephone base, an extension on the front side of said auxiliary base including a panel, and electrical circuit closing elements mounted on said panel.

In testimony whereof I affix my signature.

CARLOS F. JOHANNING.